(12) United States Patent  
Grobauer et al.

(10) Patent No.: US 9,412,370 B2  
(45) Date of Patent: *Aug. 9, 2016

(54) METHOD AND SYSTEM FOR DYNAMIC CREATION OF CONTEXTS

(71) Applicant: Nuance Communications, Inc., Burlington, MA (US)

(72) Inventors: Gerhard Grobauer, Vienna (NL); Miklos Papai, Budapest (HU)

(73) Assignee: Nuance Communications, Inc., Burlington, MA (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/310,365

(22) Filed: Jun. 20, 2014

(65) Prior Publication Data

US 2014/0303976 A1  Oct. 9, 2014

Related U.S. Application Data

(63) Continuation of application No. 13/913,594, filed on Jun. 10, 2013, now Pat. No. 8,798,997, which is a continuation of application No. 12/096,055, filed as application No. PCT/IB2006/054645 on Dec. 7, 2006, now Pat. No. 8,473,296.

(30) Foreign Application Priority Data

Dec. 8, 2005 (EP) .................................... 05111834

(51) Int. Cl.
*G10L 15/183* (2013.01)
*G10L 15/26* (2006.01)

(52) U.S. Cl.
CPC ............... *G10L 15/26* (2013.01); *G10L 15/183* (2013.01)

(58) Field of Classification Search
USPC ................................................ 704/231–257
See application file for complete search history.

(56) References Cited

U.S. PATENT DOCUMENTS 5,329,596 A     7/1994  Sakou et al.
5,839,106 A *  11/1998  Bellegarda .......... G10L 15/1815
                                                        704/243

(Continued)

FOREIGN PATENT DOCUMENTS

JP   04-273299 A     9/1992
JP   2004523004 A    7/2004

(Continued)

OTHER PUBLICATIONS

Office Action mailed Dec. 10, 2013 in Japanese Patent Application No. 2013-000242.

(Continued)

*Primary Examiner* — Abul Azad  
(74) *Attorney, Agent, or Firm* — Wolf, Greenfield & Sacks, P.C.

(57) ABSTRACT

A method and a system for a speech recognition system, comprising an electronic speech-based document is associated with a document template and comprises one or more sections of text recognized or transcribed from sections of speech. The sections of speech are transcribed by the speech recognition system into corresponding sections of text of the electronic speech based document. The method includes the steps of dynamically creating sub contexts and associating the sub context to sections of text of the document template.

10 Claims, 3 Drawing Sheets

(56) References Cited

U.S. PATENT DOCUMENTS

| | | | |
|---|---|---|---|
| 5,864,819 A | 1/1999 | De Armas et al. | |
| 5,918,236 A * | 6/1999 | Wical | 715/209 |
| 6,154,213 A * | 11/2000 | Rennison et al. | 715/854 |
| 6,224,383 B1 | 5/2001 | Shannon | |
| 8,473,296 B2 | 6/2013 | Grobauer et al. | |
| 2002/0123891 A1 | 9/2002 | Epstein | |
| 2003/0105638 A1 | 6/2003 | Taira | |
| 2005/0273839 A1 | 12/2005 | Mikkonen et al. | |
| 2006/0041427 A1 | 2/2006 | Yegnanarayanan et al. | |
| 2008/0288249 A1 | 11/2008 | Grobauer et al. | |
| 2013/0275131 A1 | 10/2013 | Grobauer et al. | |

FOREIGN PATENT DOCUMENTS

| | | |
|---|---|---|
| JP | 2009-518678 A | 5/2009 |
| WO | WO 02/33691 A1 | 4/2002 |
| WO | WO 2005/050621 A2 | 6/2005 |
| WO | WO 2005/052785 A2 | 6/2005 |
| WO | WO 2006/023622 A2 | 3/2006 |

OTHER PUBLICATIONS

Office Action mailed Nov. 15, 2011 in Japanese Patent Application No. 2008-543983.

* cited by examiner

METHOD AND SYSTEM FOR DYNAMIC CREATION OF CONTEXTS

This application is a continuation under 35 U.S.C. §120 of U.S. patent application Ser. No. 13/913,594 filed Jun. 10, 2013 and entitled "Method and System for Dynamic Creation of Contexts," which is a continuation of U.S. patent application Ser. No. 12/096,055 filed on Jun. 4, 2008 and entitled "Method and System for Dynamic Creation of Contexts," which is a national stage application of PCT/IB2006/054645 filed Dec. 7, 2006 and entitled "Method and System for Dynamic Creation of Contexts," which claims the benefit of European Patent Application No. EP 05111834.7 filed Dec. 8, 2005 and entitled "Method and System for Dynamic Creation of Contexts," the contents of all of which are incorporated herein by reference in their entirety.

This invention pertains in general to the field of Speech Recognition. More particularly the invention relates to a method and system for dynamic creation of specialized contexts.

Speech recognition (SR) systems are today becoming increasingly effective and are well used within a plurality of industries. Speech recognition is the process by which an acoustic signal received by a microphone is converted to a document, comprising a set of words, by a computer. These recognized words may then be used in a variety of applications for different purposes. Automatic speech recognition systems, which convert speech into text, are desired to result in cost-efficient document creation and high transcription productivity.

However, the fact that the document created by means of speech recognition needs to be corrected or reviewed subsequently by the author, transcriptionists, Quality assurance (QA) persons or others by means of revising the document by hand or by dictation, increases the complexity of these speech recognition systems.

Several ideas of improving the speech recognition accuracy have been proposed over the last few years. Publication, WO 2005/052785, discloses an example of how to use the knowledge of the document structure for more efficient document creation. A framework is used for detecting and processing the logical structure of the document to produce a speech-enabled document.

It is known to use one single speech recognizer configuration globally for a whole document with a constant set of e.g. acoustical references, language models, lexica or dictionaries and grammatical rules. In this case data might be too general or large, e.g. a superset of all potential topics, which might lower the recognition rate and there is no dynamic way to fine-tune the configuration.

It is also known to use a finite set of locally static configurations, contexts, such as a specific lexicon, a language model and document specific grammars, etc., for each part or section of a document. In these cases it may be difficult to determine the various configurations and mapping them to the parts of the document in general. The creation of the specific local configurations is also a very time consuming process since context creation involves handling a corpus usually consisting of millions of words.

For instance, within medical dictation systems, it is known that when a medical doctor dictates a report, e.g. a spine X-ray report, the speech recognition system uses a general radiology configuration, i.e. a radiology context, which includes a lexicon, a language model and grammars specific for radiology. However, the field of radiology is still very broad and due to misrecognitions incorrect words are recognized, which might be completely unrelated, e.g. retina, to the specific topic, e.g. spine. The context provided by such systems is hence still static and lacks exactness or specificity with regard to the lexicon or specific vocabulary used. Quite often the context is too general and it supports much more words and sentences than might be needed in a certain document region. Thus, it would be desired to emphasize those words and sentences, a subset of the context, which are really needed in a specific document region.

Hence, an improved system, which is less static, and with better and narrower context adaptation and creation for lowering the speech recognition systems error rate would be advantageous.

Accordingly, the present invention preferably seeks to mitigate, alleviate or eliminate one or more of the above-identified deficiencies in the art and disadvantages singly or in any combination and solves at least the above-mentioned problems, at least partly, by providing a system and a method for dynamically creating specialized contexts, according to the appended patent claims.

More specifically, the present invention relates to a speech recognition system which extracts structure and content information, e.g. headings, tags, etc., from a text document and uses it for improving speech recognition. Specialized contexts are automatically created or generated, e.g. lexicon, grammars and language models, for sections of the text document.

According to one aspect of the invention, there is provided a method for a speech recognition system, comprising an electronic document, which is a speech based document comprising one or more sections of text recognized or transcribed from sections of speech. The sections of speech are dictated by an author and processed by a speech recognizer in the speech recognition system into corresponding sections of text of the speech based document. The method comprising dynamically creating and/or adapting sub contexts by the speech recognizer and associating the sub context to the sections of text. The method may further comprise steps of: identifying a basic topic related to the electronic document; associating a basic context to the electronic document, said basic context comprising at least a set of words and the usage of the set of words related to the basic topic; identifying sub topics, each related to a specific section of text in the electronic document; creating the sub contexts from the basic context, the sub contexts comprising at least a specified set of words and the usage of the set of specified words related to the sub topic, respectively; and associating each of the sub contexts to a matching section of text in the electronic document. Furthermore, the method may comprise the steps of creating the sub contexts to each section of text and adapting said sub context in said electronic document is automatically performed. Moreover, the method may comprise creating said sub contexts from said basic context comprising identifying words related to the specific section of text differing from the remainder of the electronic document and creating the set of specified words by using the basic context.

According to another aspect of the invention, there is provided a system for a speech recognition system, comprising an electronic document, which is a speech based document comprising one or more sections of text recognized or transcribed from sections of speech. The sections of speech are dictated by an author and processed by a speech recognizer in the speech recognition system into corresponding sections of text of the speech based document. The system comprises means for creating and/or adapting sub contexts by the speech recognition system and means for associating the sub context to the sections of text. The system may also comprise means for identifying a basic topic related to the electronic document, means for associating a basic context to the electronic document, where the basic context comprises at least a set of words and the usage of the set of words related to the basic topic, means for identifying sub topics, each related to a specific section of text in the electronic document, means for creating sub contexts from the basic context, where the sub contexts comprises a least a specified set of words and the usage of the set of specified words related to the sub topic, respectively, and means for associating each of the sub contexts to a matching section of text in the electronic document. Furthermore, the means for creating and/or adapting sub contexts to each section of text in said electronic document might be automatic means. Moreover, the means for creating sub contexts from said basic context may comprise means for identifying words related to the specific section of text differing from the remainder of the electronic document and means for creating the set of specified words by using the basic context.

According to a further aspect of the invention, there is provided a computer-readable medium having embodied thereon a computer program for processing by a computer, the computer program being configured for a speech recognition system, comprising an electronic document, which is a speech based document comprising one or more sections of text recognized or transcribed from sections of speech, wherein said sections of speech are dictated by an author and processed by a speech recognizer in the speech recognition system into corresponding sections of text of said speech based document, said computer program comprising a code segment for creating and adapting sub contexts in said speech recognizer and a code segment for associating said sub context to said sections of text. The computer program may comprise: a code segment for determining a basic topic related to said electronic document; a code segment for associating a basic context to said electronic document, said basic context comprising a set of words and the usage of said set of words related to said basic topic; a code segment for identifying sub topics, each related to a specific section of text in said electronic document; a code segment for creating sub contexts by using said basic context, said sub contexts comprising at least a specified set of words and the usage of said set of specified words related to said sub topic, respectively; and a code segment for associating each of said sub context to a matching section of text in said electronic document.

The benefits of the system for dynamic creation of specialized contexts are among others ease of adapting static contexts, e.g. a generic radiology context, to user specific needs, e.g. for the part about lung x-ray in a medical report.

These and other aspects, features and advantages of which the invention is capable of will be apparent and elucidated from the following description of embodiments of the present invention, reference being made to the accompanying drawings, in which.

The following description focuses on an embodiment of the present invention applicable to speech recognition systems and in particular to a method of dynamically creating specialized contexts to be used for recognition of dictated text in a speech based document. However it will be appreciated that the invention is not limited to this application but may be applied to many other dictation or voice managed systems.

The type of a speech-based document varies from completely unstructured plain text to very structured forms and templates. The structure of a speech-based document may be defined statically (e.g. as part of the template) or created dynamically by the author from a set of document building elements.

For the sake of simplicity, "speech based document" will be referred to as "document" in the remainder of this specification, wherein the documents are envisaged for reproduction of information, which at least partly is derived from speech.

Figure 1:
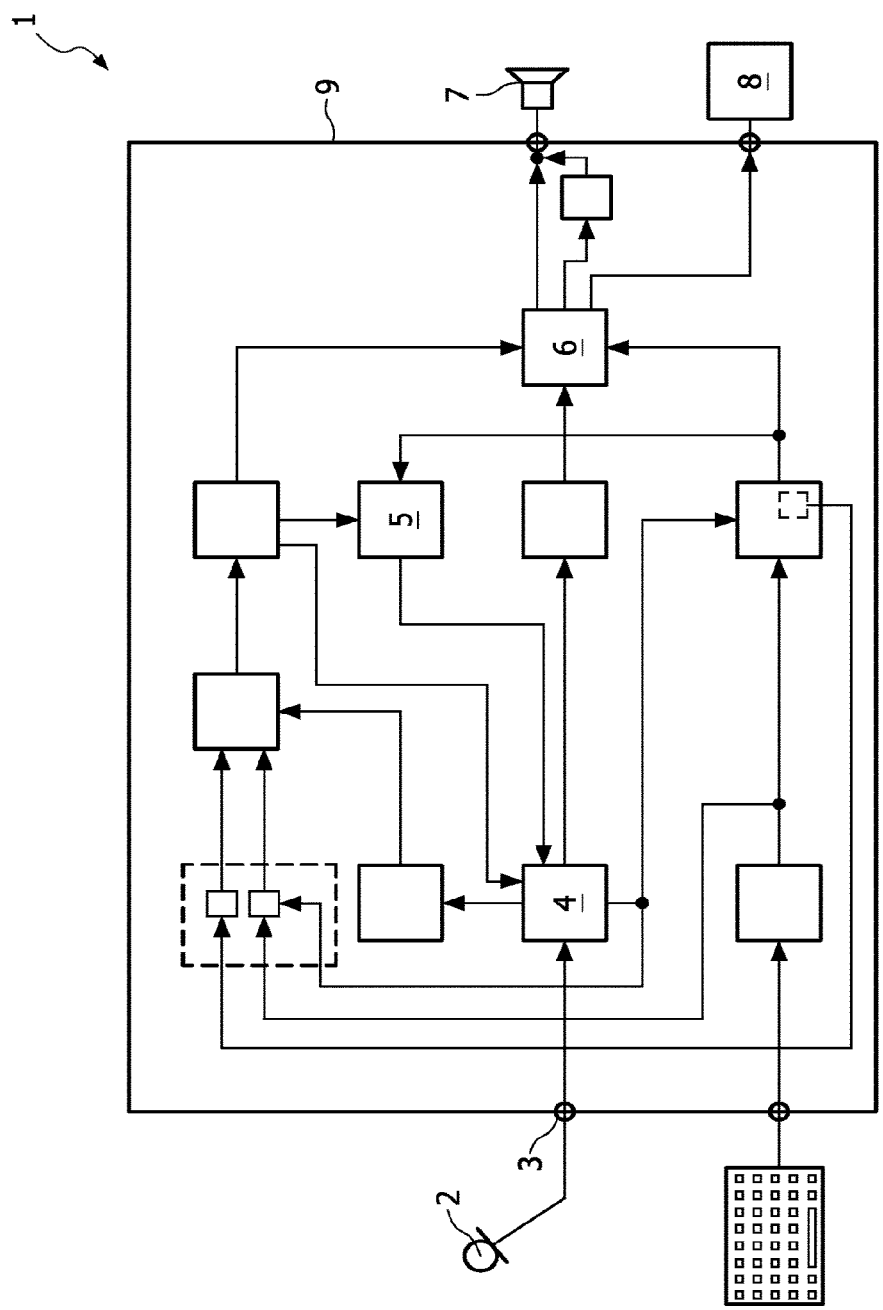
FIG. 1 is a block diagram of a device according to an exemplifying embodiment of the present invention.
Figure 2:
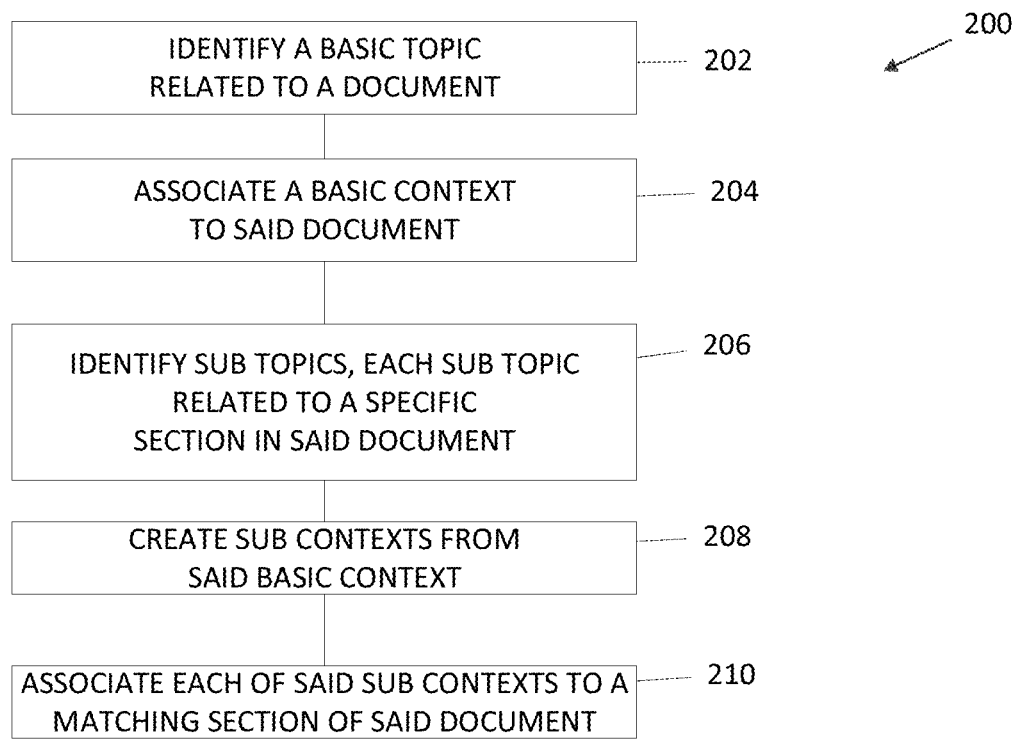
FIG. 2 is a flowchart of a method according to an illustrative embodiment of the present invention.
Figure 3:
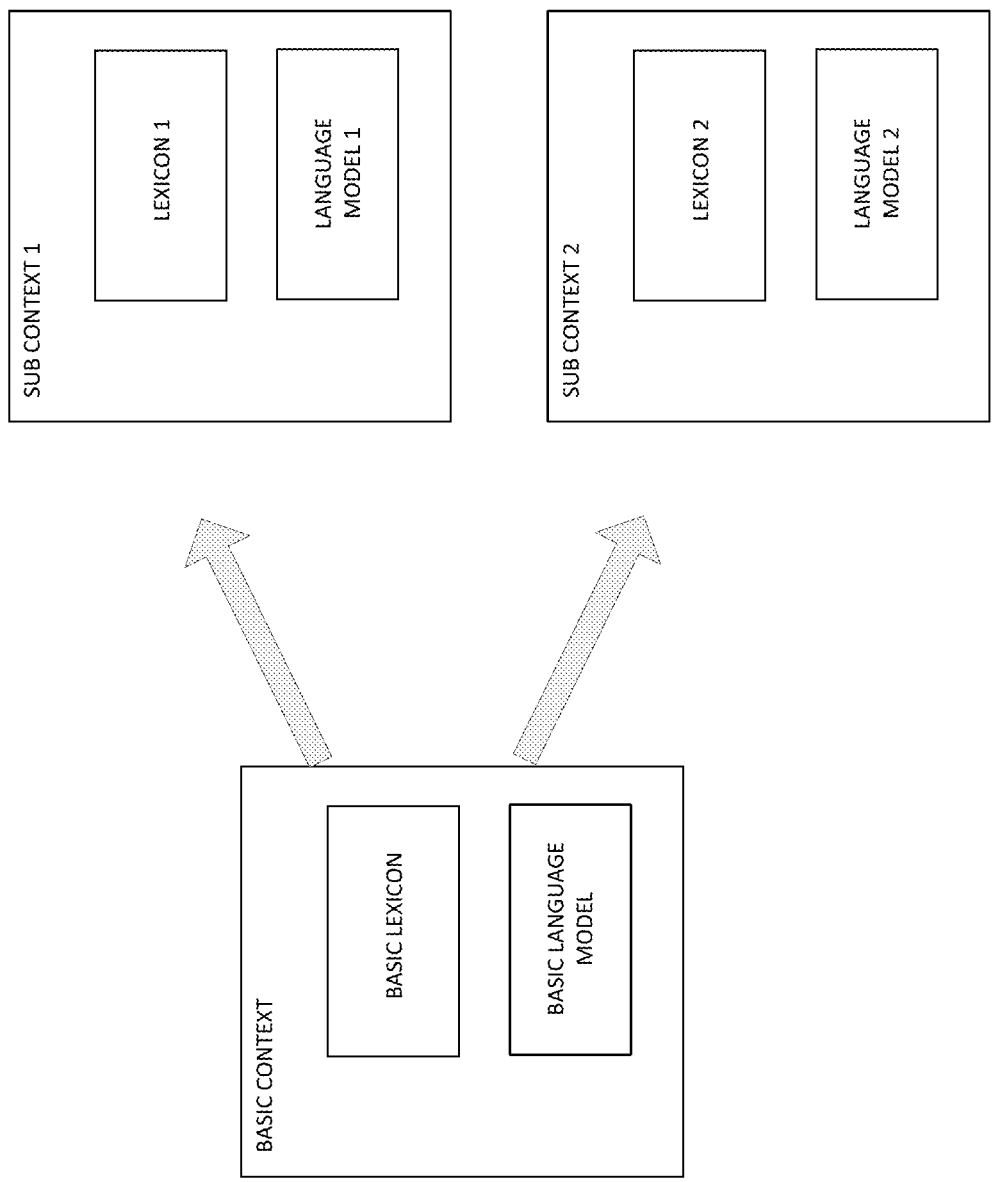
FIG. 3 is a block diagram illustrating the creation of at least one sub context based on a context according to some embodiments of the present invention.

FIG. 1 is taken from WO 2005/052785 and only portions relevant for the present invention will be explained therein. FIG. 1 discloses a system 1 that is designed for transcribing an audio signal containing signal portions into text containing text portions for a document. The audio signal represents dictation given by a speaker into a microphone 2. The system has an input 3 for receiving the audio signal. It is noted that the audio signal can also be supplied in another way, such as for example with aid of a data carrier or via a data network in form of a digital representation, if the device has means that are set up in an essential similar manner. Furthermore, The system comprises a speech-enabling framework 9.

The framework 9 of the present embodiment is implemented as computer software running on one or more data processors in a computer. However, the framework 9 may also be implemented by other means, e.g. in coded hardware, in other embodiments.

The framework includes, among others, transcription means 4 (Speech Recognizer) which are designed for receiving the audio signal and for transcribing the signal portions into the text portions. The transcription (speech recognition) of the signal portions takes place taking into account speaker data and context data. Context data represents the various selectable contexts available, wherein each context defines or comprises, a lexicon, a grammar and a language model (LM), which comprises statistical information about the probabilities of words and sequences of words. The transcription means 4 produces text data, which represent the recognized text portions.

The transcription means is configured depending on the detected structure of the document, wherein a choice is made between different contexts depending on the structure.

WO 2005/052785 discloses that if a structure element "reporting head" is recognized, a first context is selected, and if it is a structure element "chapter heading" is recognized, a second context is selected, and if it is a structure element "text" is recognized, a third context is selected. Moreover, as soon as the structure element "text" is present, the context with the maximum lexical scope is provided.

In the embodiment of the present invention, the framework 9 includes adaptation means 5, which are designed to adapt and/or improve and/or create the respective contexts for the transcription means.

The recognized text data is then passed to reproduction control means 6 which are designed to affect an acoustic and a visual reproduction of the text data of the document, which is not dealt with in further details here. The acoustic reproduction data is delivered to a first reproduction device 7, such as a loudspeaker, and the text reproduction data is transmitted to a second reproduction device 8, which is designed for visual reproduction of the information, such as a monitor or display.

A document usually has some attributes, such as a language, an author, a context, which are associated with the entire document. The context defines the available words (lexicon) and their usage (language model). The context is a superset of all the potential topics, such as headings, client specific descriptions, medication specific description, patient history, treatment, etc., which are related to a specific dictation. The context often comprises a broader set of topics and much larger number of words then the actual dictation needs. There is a trade off between dictation quality and the context "size". Since the context is finite there is a need for continuous context improvement, such as new context creation. Since quick context switching during an online dictation session often is not advisable because of run-time performance, it seems that a basic context and various sub contexts is desirable over having different contexts. Thus, instead of slow context switching the recognition will be improved based on a basic context dynamically extended by a set of sub contexts, according to the present embodiment.

Contexts may be created by collecting a large set of documents in the topic domain. A context may be general for a specific topic domain, e.g. radiology, or specialized to a certain dictation type or document template.

Some document regions may be associated with a certain topic such as patient history, treatment, etc. The topics associated with the various regions of the document may be defined by the designer of the template. The topic definition can take place at the context creation, then the speech recognition framework gets it automatically, or at speech enabling a document template or when loading a speech enabled document. This will not be dealt with in further details herein below.

In the present embodiment, a sub context is associated with a specific topic. Each topic is normally only connected with one single sub context. The sub context comprises at least a sub context lexicon and a sub context LM. The sub context LM is adapted automatically if there has been a dictation in the document region associated with that sub context.

There may also be document regions, which are not associated with a specific topic. In this case the basic context will be associated with them.

References to the basic context and the sub contexts may be stored in the document and an integrator of speech recognition may associate the references with the right context.

During dictation in a certain document region relating to a specific topic such as spine X-ray, the system uses the existing sub context for spine x-ray. The words typical for spine X-ray may be better supported and easier recognized by a spine X-ray sub context then by a basic radiology context. To the contrary, a basic radiology context might not contain some spine X-ray specific words, or provides it only with a low probability, making more difficult to recognize these words. By using the proper sub context together with its sub context language model and lexicon, the spine X-ray specific words will have a higher probability then the other words. The creation process of a sub context may be started at different times. At earliest it may be created when the basic context is created which is before or during the preparation process of the document, such as templates etc. The sub contexts may also be created when the document template is prepared by the speech recognition framework, automatically or by user interaction or partly both.

If a document has a region associated with a specific topic and therefore with a specific sub context and if a dictation is performed into that region and afterwards the document is to be context adapted then the text of that region will be dynamically adapted into the sub context.

Another feature that is included in the framework 9 also supports automatic adaptation or creation of sub contexts. This is performed by adaptation/creation means 5 for an existing context by using structure information from the document. For instance if a document region usually contains words and sentences of a certain topic like patient history, these sentences (words) are taken as candidates for creating sub contexts. Furthermore, the assumption is that the author usually dictates similar sentences into the same region of a document and to associate the proper context becomes easier.

The adaptation/creation means treats the different regions of the document in a special way. For new topics, a new sub context comprising a new lexicon and a new LM will be created, data from sections, which already have an assigned sub context, will be used for adapting exactly the assigned sub context.

An exemplary process for producing a document is as follows: An author dictates a text by use of the microphone 2. Dictation may be a plain general text dictation, dictation of a restricted topic, short texts, dictation of selected keywords identifiers, navigation commands, selection commands and/or short key activation commands. The dictation text/file enters the framework 9 of system 1, where a speech recognizer 4 processes the dictation text/file and generates a speech based document with related attributes, such a language, an author, a context.

The main topic related to the content in the speech-based document is determined. There is a predefined set of contexts available. A basic context related to said topic is adapted and/or associated to the document, the basic context comprises a set of words, basic context vocabulary, and the usage of the set of words, basic context LM. Sub contexts, which are either parts of the basic context or will be created and associated to document regions at customizing a document by detecting its structure for speech recognition purposes, i.e. at speech-enabling the document.

A sub context comprises a specified set of words, sub context vocabulary, and the usage of the set of specified words, sub context LM, related to the specified section of text, respectively. A section in the document is either not associated with a sub context or it is associated with a single sub context.

An example of a workflow of the present embodiment:

1. Topic1+SubContext1 and Topic2+SubContext2 are already related to a ContextA
2. A document template is undergoing a speech enabling procedure
3. At speech enabling, some regions of a DocumentX are associated with SubContext1.
4. A new Topic3+SubContext3 and Topic4+SubContex4 are identified at the speech enabling procedure and regions of DocumentX are associated with SubContext3 and SubContext4. Now after having finished the speech enabling procedure of DocumentX, it is prepared for efficiently dictating into it.
5. Loading the speech enabled DocumentX, the author dictates into different regions of the document. The author does not necessarily know anything about topics. Some document regions are associated with Topic1, Topic3 and Topic4.
6. Later having finished the dictation (and correction, etc.) activities, the next step is adapting DocumentX. The adaptor realizes that ContextA does not have SubContext3 and SubContext4, so the adaptor creates them.
7. Adapting the dictated words, the non-topic-related regions are adapted in the basic-context of ContextA, the other regions are adapted not only in the basic context, but also in the sub contexts.

The invention may be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the embodiments may be implemented in a single unit, or may be physically and functionally distributed between different units and processors.

Although the present invention has been described above with reference to a specific embodiment, it is not intended to be limited to the specific form set forth herein. Rather, the invention is limited only by the accompanying claims and, other embodiments than the specific above are equally possible within the scope of these appended claims. For example, there may be several levels of sub contexts and sub sub contexts.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc. do not preclude a plurality. Reference signs in the claims are provided merely as a clarifying example and shall not be construed as limiting the scope of the claims in any way.

The invention claimed is:

1. A method for converting speech dictated by a user to text in a speech based document, the method comprising:
    associating a basic context with the speech based document, the basic context comprising a first lexicon and first language model;
    associating a first sub context, of the basic context, with a first portion of the speech based document, the sub context comprising a second lexicon and a second language model;
    recognizing speech corresponding to the first portion using the first sub context; and
    recognizing speech corresponding to portions of the electronic document to which no sub context has been associated using the basic context.

2. The method of claim 1, wherein the basic context further comprises a first grammar.

3. The method of claim 2, wherein the first sub context further comprises a second grammar.

4. The method of claim 1, further comprising associating a second sub context, of the basic context, with a second portion of the speech based document, the second sub context comprising a third lexicon and a third language model, and recognizing speech corresponding to the second portion using the second sub context.

5. The method of claim 4, wherein the second sub context further comprises a third grammar.

6. A system for converting speech dictated by a user to text n a speech based document, the system comprising:
    at least one processor configured to:
        associating a basic context with the speech based document, the basic context comprising a first lexicon and first language model;
        associating a first sub context, of the basic context, with a first portion of the speech based document, the sub context comprising a second lexicon and a second language model;
        recognizing speech corresponding to the first portion using the first sub context; and
        recognizing speech corresponding to portions of the electronic document to which no sub context has been associated using the basic context.

7. The system of claim 6, wherein the basic context further comprises a first grammar.

8. The system of claim 7, wherein the first sub context further comprises a second grammar.

9. The system of claim 6, wherein the at least one processor is configured to:
    associate a second sub context with a second portion of the speech based document, the second sub context comprising third lexicon and a third language model; and
    recognize speech corresponding to the second portion using the second sub context.

10. The system of claim 9, wherein the second sub context further comprises a third grammar.

* * * * *